United States Patent
Keeth et al.

(10) Patent No.: US 11,644,982 B2
(45) Date of Patent: *May 9, 2023

(54) UNAUTHORIZED ACCESS COMMAND LOGGING FOR MEMORY

(71) Applicant: Micron Technology, Inc., Boise, ID (US)

(72) Inventors: Brent Keeth, Boise, ID (US); Naveh Malihi, University City, MO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,787

(22) Filed: Nov. 5, 2021

(65) Prior Publication Data
US 2022/0057943 A1   Feb. 24, 2022

Related U.S. Application Data

(63) Continuation of application No. 16/235,482, filed on Dec. 28, 2018, now Pat. No. 11,169,717.

(51) Int. Cl.
| | | |
|---|---|---|
| *G06F 12/00* | (2006.01) | |
| *G06F 3/06* | (2006.01) | |
| *G06F 21/62* | (2013.01) | |

(52) U.S. Cl.
CPC .......... *G06F 3/0622* (2013.01); *G06F 3/0653* (2013.01); *G06F 3/0659* (2013.01); *G06F 3/0673* (2013.01); *G06F 21/6245* (2013.01)

(58) Field of Classification Search
CPC .... G06F 3/0622; G06F 3/0653; G06F 3/0673; G06F 3/0659; G06F 21/6245; G06F 3/0679; G06F 3/0637

(Continued)

(56) References Cited

U.S. PATENT DOCUMENTS 5,642,112 A * 6/1997 Cooper ................... G06T 9/005
                                                                341/51
5,900,019 A    5/1999 Greenstein et al.
(Continued)

FOREIGN PATENT DOCUMENTS

| | | |
|---|---|---|
| CN | 1487424 | 4/2004 |
| CN | 107292176 | 10/2017 |
| EP | 1638109 A2 | 3/2006 |

OTHER PUBLICATIONS

International Search Report and Written Opinion for related PCT Application No. PCT/US2019/064906, dated Mar. 26, 2020, 12 pages.

(Continued)

*Primary Examiner* — Mardochee Chery
(74) *Attorney, Agent, or Firm* — Brooks, Cameron & Huebsch, PLLC

(57) ABSTRACT

Apparatuses and methods related to tracking unauthorized access commands for memory. Identifying unauthorized memory access can include verifying whether an access command is authorized to access a protected region of a memory array. The authorization can be verified utilizing a key and a memory address corresponding to the access command. If an access command is authorized to access a protected region, then a row of the memory array corresponding to the access command can be activated. If an access command is not authorized to access the protected region, then an access count can be incremented to signify the unauthorized access command.

20 Claims, 5 Drawing Sheets

(58) Field of Classification Search
USPC .......................................................... 711/164
See application file for complete search history.

(56) References Cited

U.S. PATENT DOCUMENTS

| | | |
|---|---|---|
| 6,715,049 B1 | 3/2004 | Hayakashi |
| 6,804,730 B1 | 10/2004 | Kawashima |
| 7,266,658 B2 | 9/2007 | Harrington et al. |
| 10,417,436 B2 | 9/2019 | Li et al. |
| 2002/0101995 A1 | 8/2002 | Hashimoto et al. |
| 2004/0236919 A1 | 11/2004 | Okaue et al. |
| 2007/0157029 A1 | 7/2007 | Mani |
| 2008/0244208 A1 | 10/2008 | Narendra et al. |
| 2009/0241200 A1 | 9/2009 | Li et al. |
| 2009/0249014 A1 | 10/2009 | Obereiner et al. |
| 2014/0136806 A1 | 5/2014 | Rudelic |
| 2016/0029220 A1 | 1/2016 | Obaidi |
| 2017/0060782 A1 | 3/2017 | Chinnakkonda Vidyapoornachary et al. |
| 2017/0371809 A1 | 12/2017 | Benedict |
| 2018/0067874 A1 | 3/2018 | Connolly et al. |

OTHER PUBLICATIONS

First Office Action from related China Application No. 201980086540.7, dated Jan. 28, 2022, 25 pages.

* cited by examiner

UNAUTHORIZED ACCESS COMMAND LOGGING FOR MEMORY

PRIORITY INFORMATION

This application is a Continuation of U.S. application Ser. No. 16/235,482, filed Dec. 28, 2018, the contents of which are included herein by reference.

TECHNICAL FIELD

The present disclosure relates generally to memory, and more particularly to apparatuses and methods associated with unauthorized access command logging for memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random-access memory (PCRAM), resistive random-access memory (RRAM), and magnetoresistive random-access memory (MRAM), among others.

Memory is also utilized as volatile and non-volatile data storage for a wide range of electronic applications including, but not limited to, personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). For various reasons, it can be desirable to prevent unauthorized access to memory (e.g., via read and/or write operations) or particular portions thereof. For instance, a memory system may store sensitive data (e.g., data desired to be kept secret, such as passwords, personal information, etc.).

DETAILED DESCRIPTION

Figure 1:
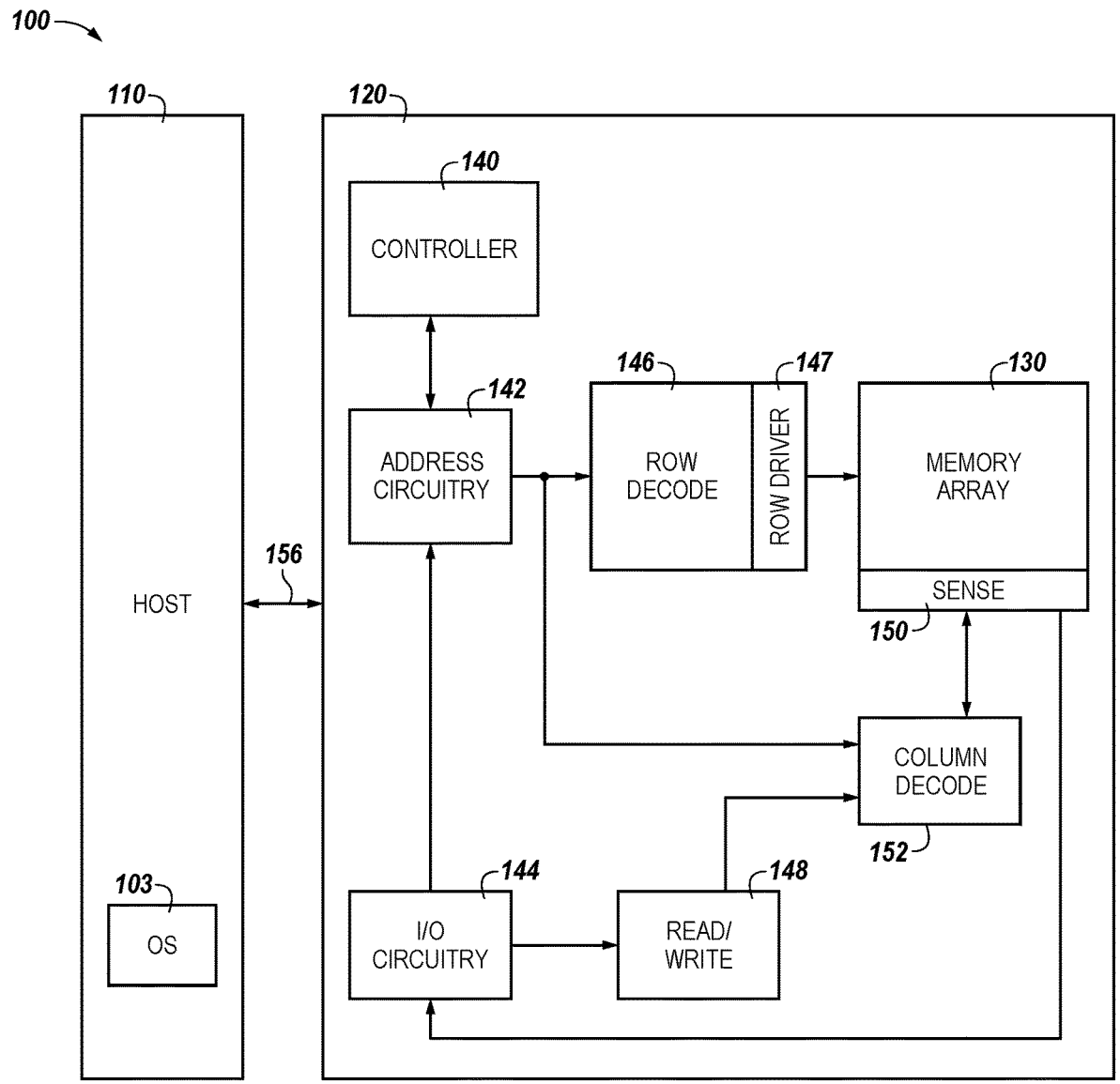
FIG. 1 is a block diagram of an apparatus in the form of a computing system including a memory device in accordance with a number of embodiments of the present disclosure.

The present disclosure includes apparatuses and methods related to mitigating unauthorized memory access. Access commands can be provided from a host to a memory device. The memory device may rely on the host for implementing security measures to prevent unauthorized access to the memory device. However, implementing security measures at the memory device may further improve security and may mitigate unauthorized memory accesses.

In various embodiments, a memory device can mitigate unauthorized memory accesses by verifying access commands as authorized utilizing credentials provided along with, or as part of, the access commands. The credentials can be stored in a plurality of registers implemented in the memory device prior to receipt of the access command (e.g., from a host). As used herein, an access command can be comprised of one or more commands. For example, an access command can include a pre-charge command, an activate command, a read command, and/or a write command, among other possible commands.

The authorization of an access command can be verified utilizing a key (e.g., credential(s)). The access command can request access to an address and/or a plurality of addresses. The memory device can determine whether the address is locked or unlocked based on a security mode associated with the address. If the address is locked, then the memory device can refrain from providing access to the address unless a key associated with the access command is also provided to the memory device. The key can be verified against a stored key to determine whether to unlock the address.

If the key matches the stored key, then the memory device can unlock the address and can provide access to the address(es). If the key does not match the stored key, then the memory device can refrain from providing access to the address(es). If the key does not match the stored key, the memory device can log the access attempt by incrementing an access count. The access count can log unauthorized access attempts (e.g., commands) to a protected region of memory device. In some examples, the access count can be accessed to determine whether unauthorized access attempts have occurred and/or how many unauthorized access attempts have occurred. In other examples, a memory device can be configured to provide a notification (e.g., to a host) responsive to logging an authorized access attempt or responsive to the count of unauthorized access attempts reaching a threshold value.

Implementing security measures at a memory device to prevent unauthorized access can increase the security of the memory device beyond the security which may be provided by a host. For example, unauthorized access commands may be prevented from accessing the memory device by security measures implemented at a host as well as by security measures implemented at a memory device.

In various examples, unauthorized access attempts can be detected, and data can be protected based on the detection. A security mode corresponding to a protected region of a memory array storing the data can be modified responsive to the detection of the unauthorized access attempts. The protected region can be placed in a first security mode from a second security mode where the first security mode is a more heightened security mode than the second security mode. The data can be moved to a different protection region and/or an unprotected region responsive to the detection of the unauthorized access attempts. In some examples, a power status of a computing device comprising the memory array can be modified responsive to the detection of the unauthorized access attempts. The computing device can be shut down or placed in a sleep state. Responsive to detecting the unauthorized access attempts, the memory device targeted by the access attempt or the computing device comprising the memory device can be locked to prevent access to the memory device and/or the computing device.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 100 including a memory device 120 in accordance with a number of embodiments of the present disclosure. As used herein, a memory device 120, a memory array 130, and/or host 110, for example, might also be separately considered an "apparatus."

In this example, system 100 includes a host 110 coupled to memory device 120 via an interface 156. The computing system 100 can be a personal laptop computer, a desktop computer, a digital camera, a mobile telephone, a memory card reader, or an Internet-of-Things (IoT) enabled device, among various other types of systems. Host 110 can include a number of processing resources (e.g., one or more processors, microprocessors, or some other type of controlling circuitry) capable of accessing memory 120. The system 100 can include separate integrated circuits, or both the host 110 and the memory device 120 can be on the same integrated circuit. For example, the host 110 may be a system controller of a memory system comprising multiple memory devices 120, with the system controller 110 providing access to the respective memory devices 120 by another processing resource such as a central processing unit (CPU).

In the example shown in FIG. 1, the host 110 is responsible for executing an operating system (OS) 103 and/or various applications that can be loaded thereto (e.g., from memory device 120 via controller 140).

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines (which may be referred to herein as digit lines or data lines). Although a single array 130 is shown in FIG. 1, embodiments are not so limited. For instance, memory device 120 may include a number of arrays 130 (e.g., a number of banks of DRAM cells).

The memory device 120 includes address circuitry 142 to latch address signals provided over an interface 156. The interface can include, for example, a physical interface employing a suitable protocol (e.g., a data bus, an address bus, and a command bus, or a combined data/address/command bus). Such protocol may be custom or proprietary, or the interface 156 may employ a standardized protocol, such as Peripheral Component Interconnect Express (PCIe), Gen-Z, CCIX, or the like. Address signals are received and decoded by a row decoder 146 and a column decoder 152 to access the memory array 130. Data can be read from memory array 130 by sensing voltage and/or current changes on the sense lines using sensing circuitry 150. The sensing circuitry 150 can comprise, for example, sense amplifiers that can read and latch a page (e.g., row) of data from the memory array 130. The I/O circuitry 144 can be used for bi-directional data communication with host 110 over the interface 156. The read/write circuitry 148 is used to write data to the memory array 130 or read data from the memory array 130. As an example, the circuitry 148 can comprise various drivers, latch circuitry, etc.

Controller 140 decodes signals provided by the host 110. These signals can include chip enable signals, write enable signals, and address latch signals that are used to control operations performed on the memory array 130, including data read, data write, and data erase operations. In various embodiments, the controller 140 is responsible for executing instructions from the host 110. The controller 140 can comprise a state machine, a sequencer, and/or some other type of control circuitry, which may be implemented in the form of hardware, firmware, or software, or any combination of the three.

In accordance with various embodiments, the controller 140 can be configured to decode a security mode initialization command received thereto. The security mode initialization command can be received from the host 110. The security mode initialization command can be provided to the memory device 120 to set a security mode of the memory device 120 and/or to designate one or more protected regions of the memory device 120. A security mode can include a locked mode and an unlocked mode. The memory device 120 can be configured to provide access to a protected region of the memory array 130 if the memory device 120 is in an unlocked mode or to prevent access to the protected region of the memory array 130 if the memory device 120 is in a locked mode.

The OS 103, as executed by the host 110, can initialize the security mode initialization command to store a key and an address or a range of addresses of the memory array 130 in one or more registers of the controller 140. The stored key and address can define the protected region of the memory array 130. The OS 103 can initialize the security mode initialization command during an initialization of the OS 103 or a time after the OS 103 is initialized.

The key can be a security token used to gain access to a protected region of the memory array 130. The key can be encrypted or unencrypted. The key can be provided by the OS 103 and used by the OS 103 to access the protected region of the memory array 130. The key can be unique to a protected region of memory and/or can be associated with a plurality of protected regions of memory. As described further below, the key can comprise one or more bits which can be stored in one or more registers of the memory device 120.

The protected region of the memory array 130 describes a region of the memory array 130 that is protected using the key. The protected range can be defined by a first memory address and a second memory address. The first memory address can be a starting address and the second memory address can be an ending address. In some examples, the protected range is stored as a starting address and as an offset. The offset together with the starting address can be used to generate the ending address. The protected region can be continuous from the starting address to the ending address.

In some examples, the memory array 130 can comprise one or more protected regions. Each of the protected regions can be defined using a starting address and an offset. Each of the starting addresses corresponding to a different protected region can be unique and/or can be a same starting address. Each of the offsets can also be a same offset or a different offset.

In various instances, the host 110 can provide an access command to the memory device 120. The access command can be provided to access a protected region of the memory device 120. The access command can be associated with an address or a range of addresses and a key. The memory device 120 can compare the provided address to a protected range to determine whether the address is within the protected range. If the address is within the protected range, the memory device 120 can compare the key with a stored key to determine whether the key and the stored key match. If the key matches the stored key, then the memory device can enter an unlocked mode from a locked mode. The memory device 120 can, via the controller 140, enable a row driver to activate a row of the memory array 130 corresponding to the address (e.g., protected region).

If the key does not match, the memory device 120 can, via the controller 140, prevent access to the protected region by preventing enablement of the row driver 147 of the memory array 130, thus preventing activation of a row corresponding to the access command. The memory device 120 can further log the unauthorized access command to the protected region by incrementing an access count (e.g., a count of unauthorized access attempts). The access count can be used to provide notice of the unauthorized access command.

Figure 2:
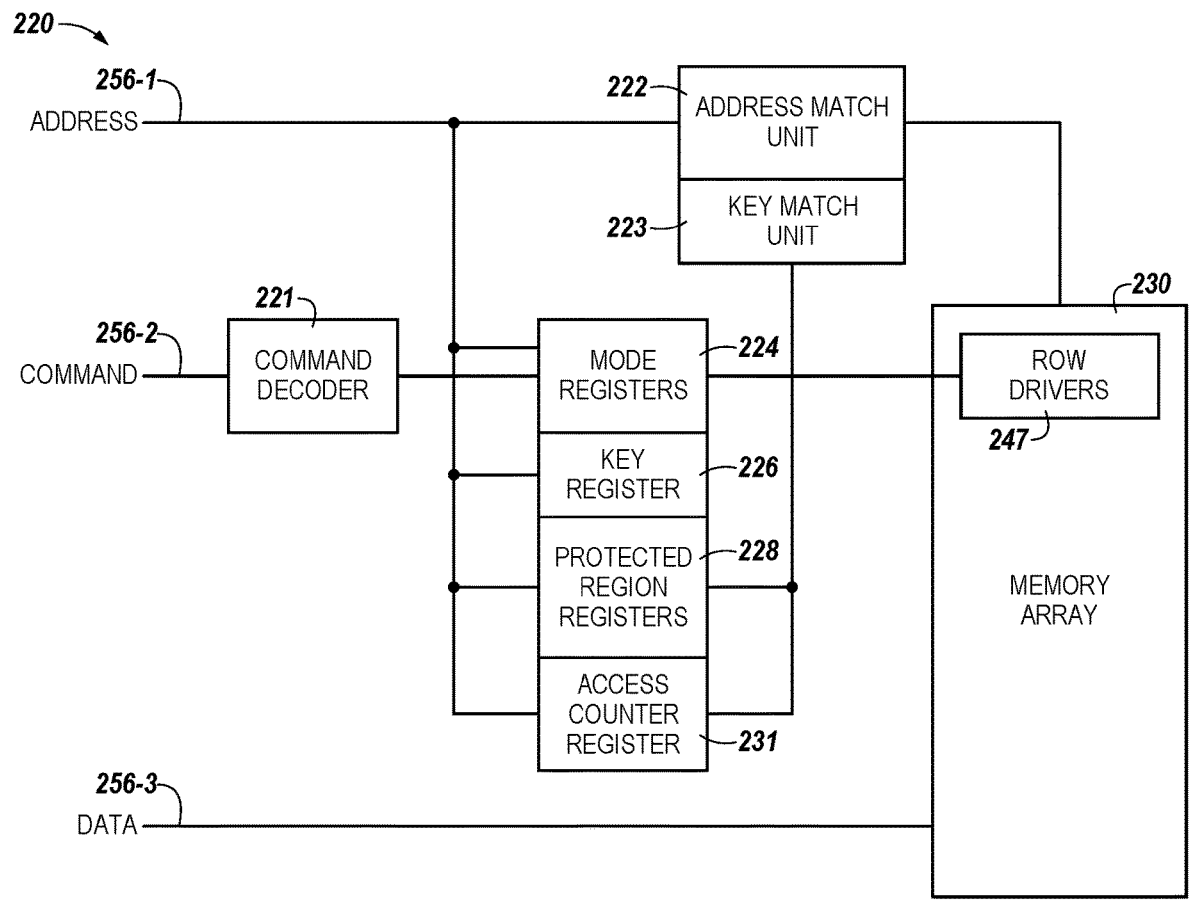
FIG. 2 is a block diagram of an apparatus in the form of a memory device including a memory array and portions of a controller capable of incrementing an access count for unauthorized access commands in accordance with a number of embodiments of the present disclosure.

FIG. 2 is a block diagram of an apparatus in the form of a memory device 220 including a memory array 230 and portions of a controller capable of incrementing an access count for unauthorized access commands in accordance with a number of embodiments of the present disclosure. The memory device 220 can be analogous to the memory device 120 in FIG. 1. The memory device 220 includes the memory array 230 and portions of a controller such as the controller 140 in FIG. 1.

The controller can include a command decoder 221, mode registers 224, a key register 226, protected region registers 228, and an access counter register 231. The controller can also include the address match unit 222 and a key match unit 223.

In this example, the interface (e.g., 156 shown in FIG. 1) comprises an address bus 256-1, a command bus 256-2, and a data bus 256-3. The device 220 can receive the security mode initialization command and/or access commands along with keys via the command bus 256-2. The device 220 can receive addresses via the address bus 256-1, and data can be provided to/from the device 220 via the data bus 256-3.

A host can provide, via the command bus 256-2, the security mode initialization command to initialize a security mode of the memory device 220. The memory device 220 can receive the security mode initialization command at the command decoder 221. The command decoder 220 can decode the security mode initialization command.

In various examples, the security mode initialization command can be associated with a key and a number of addresses received via the command bus 256-2 and the address bus 256-1.

The controller can store a key in the key register 226 and can store the one or more addresses in the protected region registers 228. Each of the mode registers 224, the key registers 226, the protected region registers 228, and/or the access counter register 231 can be comprised of one or more registers.

The one or more addresses can be stored in the protected region registers 228 as a starting address and an offset. The starting address can be stored in a first register of the protected regions registers 228 and the offset can be stored in a second register of the protected region registers 228. The starting address and the ending address can define a protected region of the memory array 230, which can be stored in the protected region register 228.

The key can be stored in the key register 226. In some examples, a plurality of keys can be stored in one or more key registers including the key register 226. Each of the plurality of keys can be associated with a different one of the plurality of protected regions stored in the protected region registers including the protected region register 228. The plurality of keys can be used to allow access to the protected regions. For example, a first key can be used to allow access to a first protected region and a second key can be used to allow access to a second protected region.

Responsive to storing the key in the key register 226 and the address in the protected region register 228, the controller can change a security mode of the memory device 220 from an unlocked mode to a locked mode in the mode registers 224. The mode registers 224 can include a security mode register. The security mode register can store a first value representing an unlocked mode or a second value representing a locked mode, among other possible modes. The locked mode can be used to prevent access to a protected region of the memory array 230. An unlocked mode can be used to allow access to a protected region of the memory array 230.

In some examples, responsive to receipt of the security mode initialization command, the controller can set an access counter register 231. For example, the access counter register 231 can be set to zero. The access counter register 231 can provide a count of access commands directed to the protected region of the memory array 230 (e.g., as defined by protected region register 228).

The controller can also process access commands. For example, an access command received via the command bus 256-2 can be decoded by the command decoder 221. The address match unit 222 can receive an address corresponding to the access command at the address match unit 222 of the controller. The address match unit 222 can determine whether the received address is within a protected region (e.g., as stored in the protected region register 228).

If the received address is in a protected region, then the controller, via the key match unit 223, can determine whether the key associated with the access command matches a key stored in the key register 226. If the key associated with the access command matches the key stored in the key register 226, then the controller can modify the mode registers 224 from a locked mode to an unlocked mode.

The controller can provide a signal to the row drivers 247 to activate a row corresponding to the received address if the mode registers 224 reflect an unlocked mode. The controller can prevent a signal from being provided to the row drivers 247 if the mode registers 224 reflect a locked mode. Although the row drivers 247 are shown as being in the memory array 230, the row drivers 247 can also be implemented externally to the memory array 230 as shown in FIG. 1.

The controller can also include the access counter register 231. The access counter register 231 can store an access count. Although the access counter register 231 is described as a single register, the access count register 231 can be comprised of multiple registers. The access count register 231 can store one or more bits such that the access count is comprised of one or more bits. In examples where the access count is comprised of more than one bit, the access count register 231 can be incremented if the key associated with the access command does not match the key stored in the key register 226. For example, the access count can be set to zero and can be incremented to one upon determining that the key associated with the access command does not match the key stored in the key register 226. That is, the access count can be incremented upon determining that an unauthorized access command has been received by the memory device 220.

An access command can be unauthorized if the key corresponding to the access command does not match a key stored in the key register 226. A key associated with the access command can be determined to not match a key stored in the key register 226 if no key is associated with the access command or if the key associated with the access command 226 does not have the same value as the key stored in key register 226. In some examples, a mismatch of the keys can be determined if the key stored in the key register 226 cannot be derived from the key associated with the access command. A key stored in the key register 226 can be derived from the key associated with the access command through an encryption process and/or a decryption process. In some instances, a key can be encrypted before being stored in the key register 226. The key associated with the access command may be unencrypted. Comparing an encrypted key with an unencrypted key can include decrypted an encrypted key and comparing the decrypted key with the unencrypted key. The encrypted key can be derived from the unencrypted key if the decrypted key matches the unencrypted key.

In examples where the access counter register 231 stores a single bit, the access counter register 231 can store a first value (e.g., "0" or "1") if no unauthorized access commands have been received at the memory device 220 and a second value if one or more unauthorized access commands have been received at the memory device 220. The first value can be incremented to the second value regardless of whether or not the first value is a "0" or a "1".

In some examples, the access count can be used to provide notice of the unauthorized access. For example, the access count can be accessed periodically to verify whether an unauthorized access has been received by the memory device 220. In some examples, the access count can be retrieved utilizing the access count retrieval command. The access count retrieval command can be received from a host. The access count retrieval command can be received from a virtual machine, a hypervisor, and/or an operating system via the host.

In various instances, the memory device 220 can provide a notification to a host responsive to a detection of an unauthorized access attempt. The memory device 220 can also provide a notification to a host responsive to the access count reaching a threshold value.

The access count retrieval command can be associated with a received key. The received key can be compared to a key stored in the key register 221. The comparison can determine whether the received key matches the stored key. The received key can be used to determine whether access commands are allowed access to a protected region of the memory array.

Responsive to determining that the stored key matches the received key corresponding to the access count retrieval command, the memory device can provide access to the access counter register 231. In some examples, the memory device can provide access to one of the mode registers 224, responsive to determining that the stored key matches the received key corresponding to the access count retrieval command. For example, the access count retrieval command can be a mode read command. The memory device 220 is configured to set the mode register responsive to determining that the access count is greater than one. Alternatively, the memory device 220 can be configured to set the mode register responsive to determining that the access count is greater than a threshold value. The mode register can be used to provide notice that an unauthorized access command was received by the memory device 220 without providing access to the access counter register 231.

The mode register associated with the access counter register 231 and/or the access counter register 231 can be reset responsive to being accessed. For example, responsive to determining that a received key corresponding to an access count retrieval command matches a key stored in the key register 226, the memory device 220 can reset the mode register 224 and/or the access counter register 231.

In some examples, the host can access the mode register and/or the associated access counter register 231. A hypervisor and/or a VM can access the mode register and/or the associated access counter register 231 via the host. The memory device 220 may provide notice through the mode register/access counter register 231 without identifying who the notice is provided to. The key stored in the key register 226 can be used to verify that the mode register/access counter register 231 is being accessed by a trusted source. For example, a first VM may be authorized to access the mode register/access counter register 231 and a second VM may not be authorized to access the mode register/access counter register 231. The memory device 220 can verify the first VM's authorization and verify that the second VM is not authorized utilizing the key stored in the key register 226.

Notice of the unauthorized access command can also be provided in conjunction with receiving an authorized access command to a protected region associated with the access count. For example, an authorized access command can verify that a source (e.g., host, hypervisor, VM, OS, etc.) providing the access command is also authorized to access the access counter register 231 and/or the associated mode register. The access count and/or a state of the associated mode register can be provided responsive to authenticating an access command. The access count can be returned responsive to authenticating the access command. The state of the associated mode register can include an indication that an unauthorized access command has been received or an indication that the access commands received since the last authorized access command was received have been authorized. The access counter register 231 and/or the associated mode register can be reset responsive to returning the access count and/or a state of the associated mode register.

Figure 3:
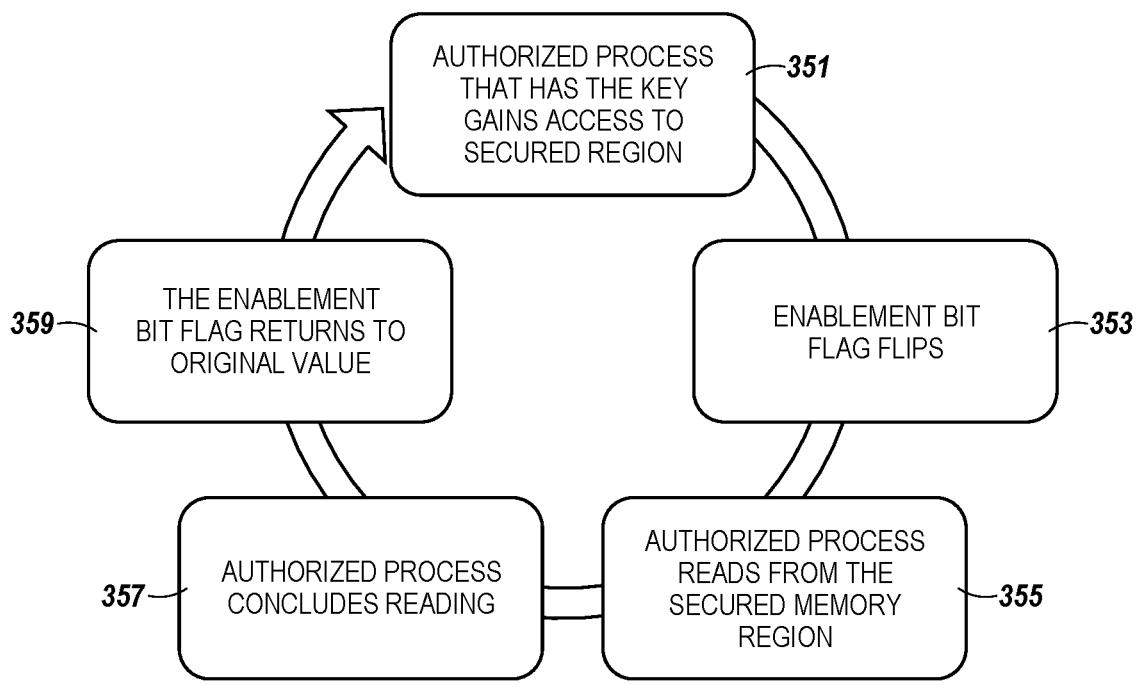
FIG. 3 illustrates an example flow diagram of a method for accessing a protected region of a memory array in accordance with a number of embodiments of the present disclosure.

FIG. 3 illustrates an example flow diagram of a method for accessing a protected region of a memory array in accordance with a number of embodiments of the present disclosure. At 351, the authorized process that has the key gains access to the security region. The process can be an instance of a program that is being executed by the host such as an application process. For example, the process can be an OS and/or a different application, among other possible processes. The process can be authorized upon verifying that a key associated with an access command provided by the process matches a stored key in the key register.

At 353, the enablement bit flag can be flipped. The enablement bit flag can be stored in a security mode register shown in FIG. 2 as one of the mode registers 224. The enablement bit flag can be flipped from a locked mode to an unlocked mode. At 355, the authorized process can read from the secured memory region. An access command can be a read command or a write command, among other possible access commands. The controller can prevent enabling a row driver from activating a row responsive to the enablement bit flag indicating the locked mode, where the row corresponds to a received address associated with the access command. For example, the controller can prevent any row driver enablement when the mode bit indicated that a secured memory region is locked.

At 357, the authorized process can conclude reading from the protected region. At 359, the controller can return the enablement bit flag to its original value. For example, the enablement bit flag can be returned to a locked mode.

In various embodiments, an OS can initiate a security mode initialization command. The security mode initialization command can be provided by the OS to define a protected region of a memory array and to associate a key with the protected region.

Defining a protected region utilizing the security mode initialization command provides the OS flexibility. The OS can have flexibility to define the size and content of a protected region of the memory array. For example, the OS can define the protected region as comprising a first size or a second size, among a number of other sizes. The OS can activate a security mode by providing the security mode initialization command or can refrain from activating the security mode by refraining from providing the security mode initialization command to the memory device.

A memory device can function in a security mode or without the security mode based on the OS's selection. Further, the OS can define a size or location of the protected region after the protected region has been initialized. For example, after initialization of a security mode, the OS can increase the size of the protected region or decrease the size of the protected region. After initialization of a security mode, the OS can also change a base address of the protected region and/or an offset of the protected region. The OS can also exit the security mode after the memory device has been placed in the security mode. For example, the OS can store a predefined value in the protected region registers. The OS can store a zero as a base address and/or an offset of the protected region to exit the security mode.

The OS can utilize an application programming interface (API) to generate the security mode initialization command and/or an access command used to define and/or access a protected region of the memory array. The OS can comply with the security features of the memory device utilizing the API.

In some examples, the security mode initialization command can be generated by the OS and/or received by the memory device as part of an initialization process of a computing device and/or the OS. The memory device can store a key in a key register responsive to receiving the security mode initialization command. The memory device can store an address of a memory device in a protected region register. The memory device can set a mode register based on the storing of the key and/or the storing of the address. The mode register can identify whether region of the memory array is protected. The memory device can set the mode register to a locked mode. The locked mode can be a protected mode.

Figure 4:
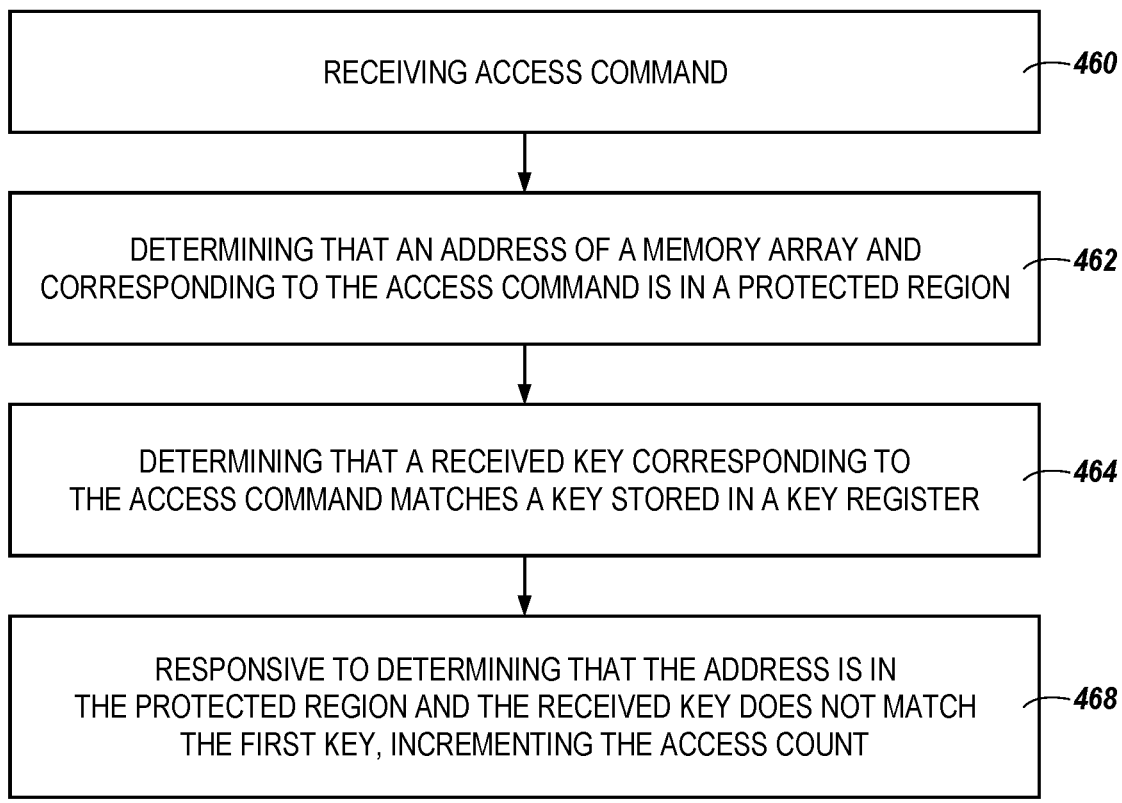
FIG. 4 illustrates an example flow diagram of a method for incrementing an access count in accordance with a number of embodiments of the present disclosure.

FIG. 4 illustrates an example flow diagram of a method for accessing a protected region of a memory array in accordance with a number of embodiments of the present disclosure. The method can be executed by a memory device of a computing system.

At 460, a memory device can receive an access command. An address of the memory array received at the memory device can correspond to the access command. At 462, a determination can be made as to whether the address of the memory array corresponding to the access command is in a protected region. The address can be within the protected region if the address is greater than a starting address of the protected region but less than the ending address of the protected region. In some examples, the access command can be associated with a plurality of addresses to access. The plurality of addresses can be within the protected region if at least one of the plurality of addresses is greater than a starting address and at least one of the of the plurality of addresses is less than the ending address of the protected region.

At 464, a determination can further be made as to whether a received key corresponding to the access command matches a key stored in the key register. The stored key can match the received key if the stored key is equal to the received key or if the stored key is substantially equal to the received key. The stored key can match the received key corresponding to the access command if the received key can be derived from the stored key, among other examples.

At 468, responsive to determining that the address is in the protected region and the received key corresponding to the access command does not match the stored key, an access count can be incremented. Incrementing an access count can include modifying the access count such that the access count reflects that an unauthorized access command was received by the memory device. For example, the access count can be incremented by one each time an unauthorized access command is received. The access count can be incremented by more than one each time an unauthorized access command is received. For example, the access count can be incremented by two, three, four, etc. In some examples, the access count can be decreased instead of incremented responsive to receiving unauthorized access commands.

The method can further comprise transmitting signaling indicative of the access count to a host device. The signaling indicative of the access count can be a notification. For example, a host can provide another command requesting a report of the access count (e.g., requesting a signaling indicative of the access count). The singling can be transmitted in response to receipt of the other command.

In some embodiments, the other command is received via a command/address bus and the singling indicative of the access count or indicative of an unauthorized access command is transmitted via a data bus. The other command can also be received in one of a series of commands that comprises the access command. The signaling can further be multiplexed with data responsive to the access command. For example, data returned responsive to receipt of the access command can include singling indicative of the access count such that the signaling can be retrieved from the data after receipt of the data.

The signaling can comprise an indication that the access count has met or exceeded a threshold value. For example, instead of the signaling comprising an indication of the access count itself, the signaling can comprise an indication that the access count has met or exceeded a threshold value. In some instances, transmitting the signaling can comprise updating a register or activating a pin. For example, transmitting the signaling can comprise updating an access count register before providing the access count via the signaling. Transmitting the signaling can comprise activating one or more pins used to provide the signaling to the host. The one or more pins can correspond to address bus, the command bus, and/or the data bus. For example, the signaling can be provided by activating one or more pins corresponding to the data bus.

In some examples, the access command can be one of a pre-charge command, an activate command, a read command, or a write command. The access count can correspond to the address corresponding to the unauthorized access command such that the access count is incremented responsive to receiving an unauthorized access command to the address. In such examples, a memory device can track multiple access counts utilizing multiple access counter registers.

The access count can correspond to a row of the memory array. Responsive to determining that the address is in the protected region, the memory device can identify a row of the memory array corresponding to the address. The memory array can increment the access count register responsive to receiving an access command to an address in the protected region and within the identified row. As such, the memory device can track multiple access counts for a protected region such that an access count can be incremented if an access command is associated with an address within a first portion of the protected region and not a second portion of the protected region and may not be incremented if the access command is associated with an address within the second portion of the protected region.

Figure 5:
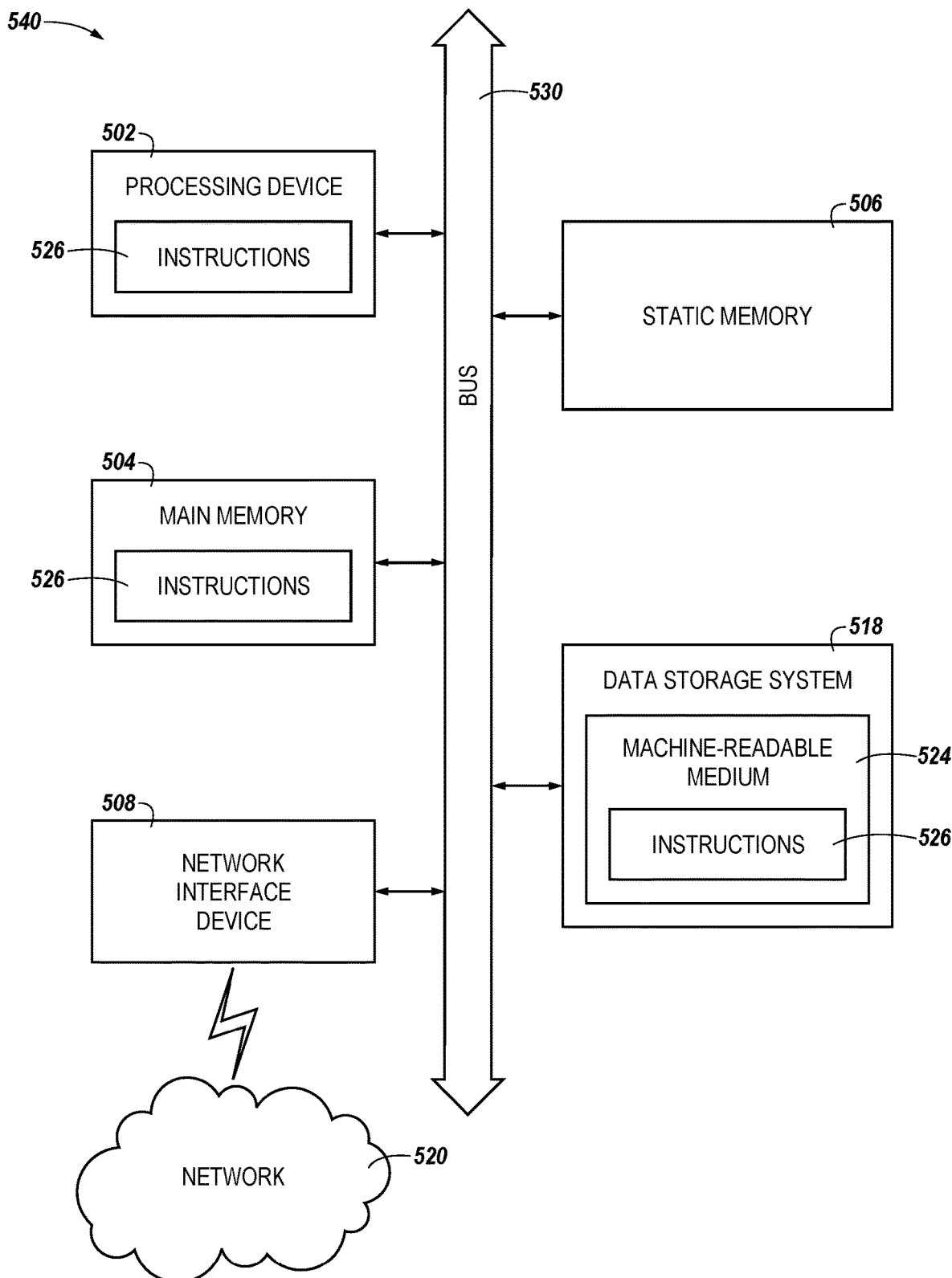
FIG. 5 illustrates an example machine of a computer system within which a set of instructions, for causing the machine to perform various methodologies discussed herein, can be executed.

FIG. 5 illustrates an example machine of a computer system 540 within which a set of instructions, for causing the machine to perform various methodologies discussed herein, can be executed. In some embodiments, the computer system 540 can correspond to a host system (e.g., the system 110 of FIG. 1) that includes, is coupled to, or utilizes a memory sub-system (e.g., the memory device 120 of FIG. 1) or can be used to perform the operations of a controller (e.g., the controller 140 of FIG. 1, including the register 224, 226,228, and 231 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform various methodologies discussed herein.

The example computer system 540 includes a processing device 502, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, a reduced instruction set computing (RISC) microprocessor, a very long instruction word (VLIW) microprocessor, or a processor implementing other instruction sets, or processors implementing a combination of instruction sets. Processing device 502 can also be one or more of a special-purpose processing device such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 540 can further include a network interface device 508 to communicate over the network 520.

The data storage system 518 can include a machine-readable storage medium 524 (also known as a computer-readable medium) on which is stored one or more sets of instructions 526 or software embodying one or more of the methodologies or functions described herein. The instructions 526 can also reside, completely or at least partially, within the main memory 504 and/or within the processing device 502 during execution thereof by the computer system 540, the main memory 504 and the processing device 502 also constituting machine-readable storage media.

In one embodiment, the instructions 526 include instructions to implement functionality corresponding to the controller 140 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory array;
   a key register configured to store a first key used to determine whether access commands are allowed access to a protected region of the memory array;
   a protected region register configured to store addresses defining the protected region;
   control circuitry coupled to the memory array, the key register, and the protected region register, and configured to:
   responsive to receiving an access command:
      determine that an address corresponding to the access command is in the protected region;
      determine whether a second key corresponding to the access command matches the first key;
      responsive to determining that the address is in the protected region and the second key matches the first key, enable a row driver of the memory array;
      responsive to determining that the address is in the protected region and the second key does not match the first key, prevent enablement of the row driver of the memory array; and
      responsive to determining that the address is in the protected region and that no key is associated with the access command, prevent enablement of the row driver of the memory array.

2. The apparatus of claim 1, wherein the control circuitry is configured to, responsive to determining that the address is in the protected region and the second key matches the first key, prevent incrementing of an access count.

3. The apparatus of claim 1, wherein the control circuitry is configured to, responsive to determining that the address is not in the protected region, prevent determining that the second key corresponding to the access command matches the first key.

4. The apparatus of claim 1, wherein the control circuitry is configured to, responsive to incrementing an access count, transmit a signaling indicative of the access command.

5. The apparatus of claim 4, wherein the control circuitry is configured to transmit the signaling by providing access to an access count register.

6. The apparatus of claim 1, wherein the control circuitry is further configured to, responsive to receiving an authorized access command to the protected region, transmit a signaling indicative of an access count to the host.

7. A method comprising:
   receiving an access command;
   receiving a second key via a command bus;
   determining whether an address corresponding to the access command is in a protected region of a memory array;
   determining whether the second key corresponding to the access command matches a first key stored in a key register;
   responsive to determining that the address is in the protected region and the second key does not match the first key, incrementing an access count and preventing signals from being provided to a row driver of the memory array; and
   responsive to determining that the address is in the protected region and that no key is associated with the access command, preventing signals from being provided to the row driver of the memory array.

8. The method of claim 7, further comprising:
   transmitting signaling indicative of the access count to a host device.

9. The method of claim 8, further comprising:
   receiving another command from the host device to report the signaling indicative of the access count; and
   transmitting the signaling in response to the other command.

10. The method of claim 9, wherein the other command is received via the command bus and the signaling indicative of the access count is transmitted via a data bus.

11. The method of claim 9, wherein the signaling indicative of the access count is multiplexed with data responsive to the access command.

12. The method of claim 8, wherein the signaling comprises an indication that the access count has met or exceeded a threshold value.

13. The method of claim 7, wherein the access count represents unauthorized access commands to the address.

14. The method of claim 7, wherein responsive to determining that the address is in the protected region, identifying a row of the memory array corresponding to the address.

15. The method of claim 14, wherein the access count represents unauthorized access commands to the row of the memory array.

16. A system, comprising:
   a host comprising a processing resource configured to execute a hypervisor; and
   a memory device configured to:
      receive an access count retrieval command from a host;
      determine whether a second key corresponding to the access count retrieval command matches a first key stored in the key register and wherein the first key is used to determine whether access commands are allowed access to a protected region of a memory array; and
      responsive to determining that the first key matches the second key, provide access to a mode register of the memory device, wherein the first key is used to access the mode register and the protected region.

17. The system of claim 16, wherein the access count retrieval command is a mode read command.

18. The system of claim 16, wherein the memory device is configured to, responsive to determining that the first key matches the second key, provide access to the mode register configured to store an indication that an unauthorized access command has been received.

19. The system of claim 18, wherein the memory device is further configured to set the mode register responsive to determining that the access count is greater than a threshold count, wherein setting the mode register includes storing a state in the mode register representing an unauthorized access command.

20. The system of claim 16, wherein the memory device is further configured to, responsive to determining that the first key matches the second key, reset the mode register.

* * * * *